July 8, 1952 S. J. CAMPBELL 2,602,276
WRAPPING MACHINE
Filed Feb. 27, 1946 6 Sheets-Sheet 2

INVENTOR
SAMUEL J. CAMPBELL
BY
Wheeler, Wheeler & Wheeler
ATTORNEYS

July 8, 1952 S. J. CAMPBELL 2,602,276
WRAPPING MACHINE
Filed Feb. 27, 1946 6 Sheets-Sheet 6

INVENTOR
SAMUEL J. CAMPBELL
BY
Wheeler, Wheeler & Wheeler
ATTORNEYS

Patented July 8, 1952

2,602,276

UNITED STATES PATENT OFFICE 2,602,276

WRAPPING MACHINE

Samuel J. Campbell, Green Bay, Wis.

Application February 27, 1946, Serial No. 650,593

22 Claims. (Cl. 53—88)

This invention relates to improvements in wrapping machines.

It is a primary object of the invention to provide a novel, improved, simplified and compact machine for wrapping such items as candy bars and neatly and tightly folding the ends of the wrapper about the bar.

Another object of the invention relates to a novel and improved arrangement for associating the candy bar with a web of wrapping material and entubing it in such web. While the machine is referred to primarily with reference to the candy bar which the particular embodiment herein disclosed was designed to wrap, it will, of course, be understood that the machine is adaptable to the wrapping of many other articles. One reason for particularly describing the invention with reference to the wrapping of the candy bar lies in the fact that the candy bar is a relatively difficult article to wrap since it is relatively soft and must be wrapped without injury to the bar.

Cross reference is made to my copending divisional application Serial No. 264,612, filed January 2, 1952, and entitled "Infeed Conveyor Particularly Designed for Use in Wrapping Machines."

Other objects of the invention will more clearly be apparent in connection with the following disclosure thereof.

Figures 3, 4:
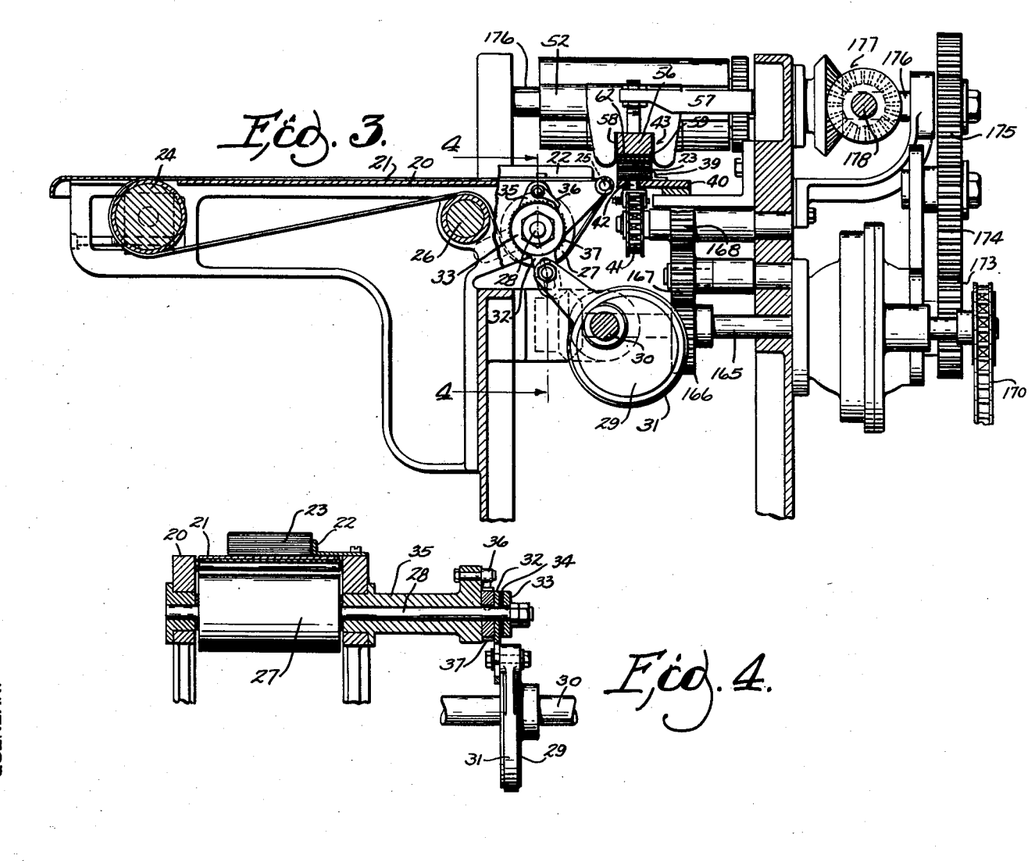
Fig. 3 is a view taken in section on line 3—3 of Fig. 1.
Fig. 4 is a view taken in section on line 4—4 of Fig. 1.

The candy bars or other work to be wrapped are assembled manually on the infeed table 20 on which there is exposed a belt conveyor 21 partially lapped by a guide 22 against which the several work pieces 23 are butted, as shown in Fig. 4.

Belt 21 is guided over idler pulleys 24, 25 and 26 and a driving pulley 27 having a shaft 28 arranged to receive intermittent motion from the eccentric 29. This eccentric is mounted on a rotating shaft 30 and provided with an eccentric strap 31 connected to an oscillating plate 32 apertured to receive the shaft 28. At the end of the shaft is friction clutch member 33 having a friction facing 34 bearing on the oscillating plate 32. The fixed bracket 35 for the shaft 28 carries a pawl 36 which engages the teeth of a ratchet wheel 37 carried by shaft 28 to prevent any retrogressive movement of such shaft. Thus the frictional bearing between the oscillatory plate or disk 32 and the clutch member 33 rotates the shaft clockwise, as viewed in Fig. 3, during each rotation of the eccentric 29, but the shaft is precluded by the pawl 36 from partaking of the counterclockwise oscillation of plate 32.

In each intermittent advance of the belt 21, one of the work pieces 23 is discharged from the belt onto the slotted conveyor plate 40 beneath which the propelling chain 41 operates in a direction longitudinally of the work piece. The conveyor chain 41 has one or more propelling lugs 42 which, projecting through the slot in plate 40, engage each successive work piece to advance it longitudinally beneath the entubing apparatus generally indicated at 43.

It is important that the conveyor belt 21 advance each successive work piece 23 into full registration with the propelling chain 41 which is to advance it longitudinally. At the same time, it is very important that before the longitudinal advance of the work piece commences, clearance should be established between this work piece and the next consecutive work piece on the belt 21. Otherwise, in the case of a candy bar the friction between the work pieces would abrade the coating of the bar and, what is perhaps more important, it would be true of any work piece that contact between successive work pieces would tend to displace the work piece on the conveyor and prevent it from feeding properly into the wrapping web as hereinafter described.

Accordingly, I provide at 39 a positive stop in the form of an angle iron against which the work piece 23 is delivered by the thrust of the belt 21 and I make the throw of eccentric 29 sufficiently great to assure that the work piece will be seated firmly against the stop 39. The spacing between the teeth of the ratchet wheel 37 is slightly less than the arc through which such ratchet wheel is advanced by the throw of eccentric 29, whereby, during the reverse oscillation of the frictional driving plate 32, a slight retrogressive movement of the ratchet wheel 33, shaft 28, pulley 27 and belt 21 will be permitted before the first ratchet tooth seats against the pawl 36. This slight retrogressive movement of belt 21 draws the successive work pieces out of contact with work piece 23 on the conveyor table 40 before the propelling lug 42 engages the last mentioned work piece to propel it longitudinally.

The wrapping web is supplied from a parent roll 44 and passes over an idler 45 to a plate 46 where it is scanned, for the purpose of registering its label with the work, by an electric eye 47 which picks up light reflected by the web from a light source 48. Thence the web passes over idlers 49 and 50 to the feed roll 51 and, after passing about the feed roll, the web is delivered from idler 52. As the web passes over the feed roll, one or more of its margins may be provided with glue by the gluing roll 53 which operates in the glue trough 54, reference being made to Fig. 2.

It is the ordinary practice in wrapping articles by entubing them in a moving web to first channel the web and then to drop into it from above the article to be entubed therein. For the purposes of the present invention, I have found it more satisfactory to form the moving web into an inverted channel into which the work is delivered from below so that the lapping margins of the web in which the article is entubed are disposed below rather than above the article.

This effects this desirable relationship without requiring that the article be fed into the machine upside down and later inverted. Inversion is impractical for many objects. For example, many candy bars have rounded tops which make it difficult, if not impossible, to wrap them upside down.

Figures 1, 6, 17, 18, 19:
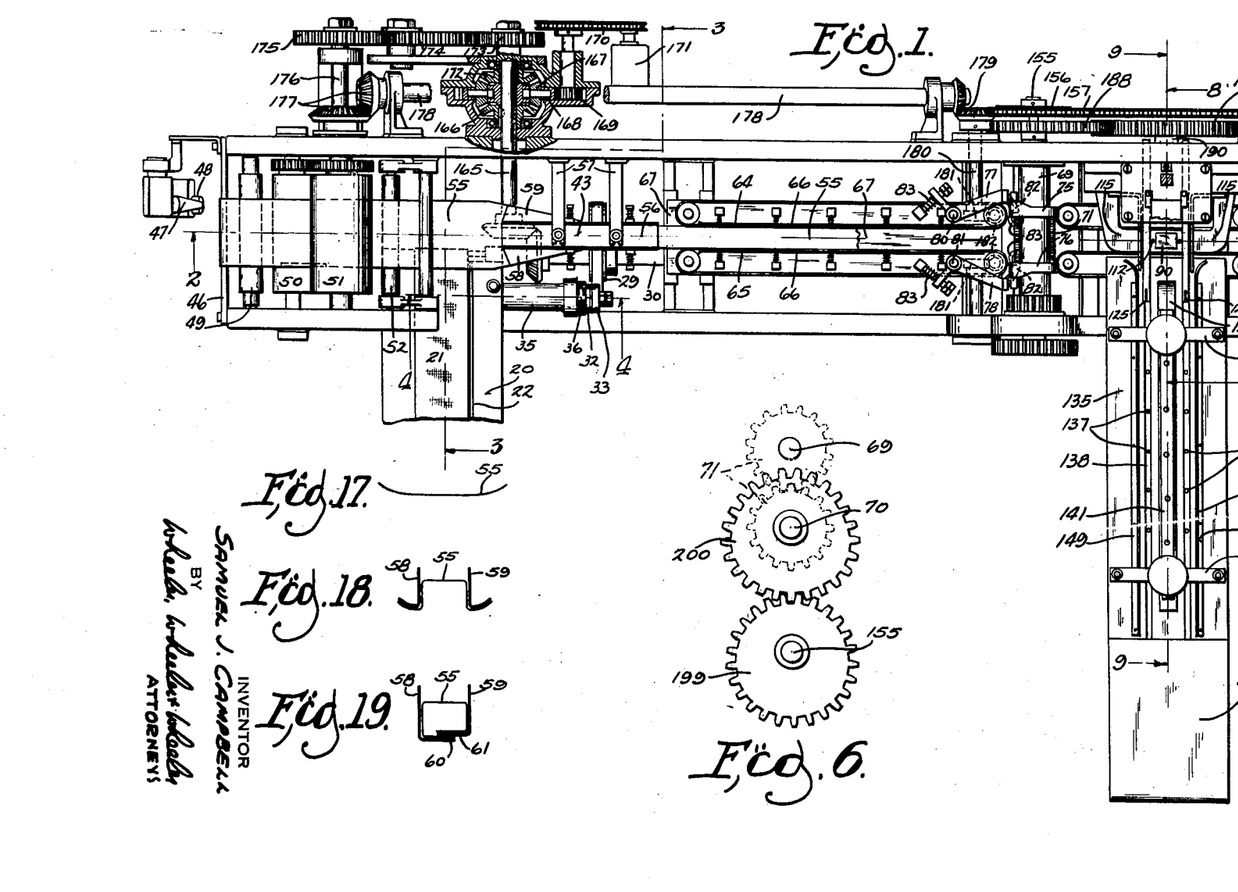
Fig. 1 is a plan view of a candy wrapping machine embodying the invention, portions of which being broken away.
Fig. 6 is a detail view in front elevation of gears for operating the crimping and cut-off mechanism.
Figs. 17, 18 and 19 are diagrammatic transverse sectional views through the wrapper web and the tubing former in the successive positions of the web indicated in Fig. 1.

As the web 55 leaves roll 52 en route to the former 43, its edges first turn upwardly as shown in Fig. 17. The former comprises a downwardly opening channel, the top of which is formed of block 56 supported by bracket arms 57. The sides of the channel comprise the folding wings 58, 59 which extend downwardly from the sides of block 56 and have inwardly directed flanges 60, 61 which lap beneath the initially open channel.

As the web is formed into channel shape by encountering the wings 58, 59 (Fig. 1), its margins are brought inwardly and turn up more sharply. However, as the movement of the web continues to the point where the flanges 60 and 61 are engaged, the sides of the web are turned inwardly and lapped by such flanges as shown in Fig. 19. Plate 62 within the former imposes light pressure to hold the web to the top of the entubed article.

As the wrapper advances and is channeled to provide a downwardly opening trough, the synchronized movement of the conveyor chain 41 pushes into the downwardly channeled wrapper the work piece last deposited on the slotted conveyor plate 40 and immediately such work piece is enveloped or entubed by the completion of the folding of the wrapper by the wings 58 and 59 and their respective flanges 60 and 61. Thus, as the wrapper and entubed work pieces, relatively spaced therein, leave the entubing mechanism at 43, the wrapper and its spaced work pieces are engaged between the forwardly moving flights of laterally spaced propelling belts 64, 65, the inner flight of each belt being provided with a pressure plate at 66 for holding the belt to the work and assuring the forward propulsion of the work between the belts, the work being supported from beneath by plate means 67. With the wrapper thus snugly entubed about the spaced work pieces, propulsion continues for a sufficient time to allow the setting of the adhesive on the lapping margins of the entubing wrapper web 55, whereby to seal such margins to each other about the entubed work pieces.

Each belt and its pulley, and supporting plate 67 comprises a unit laterally adjustable to accommodate work pieces of differing width.

Shafts 69 and 70 are spaced above and below the path of the work pieces to clear the work pieces as they leave conveyors 64 and 65. Shafts 69 and 70 carry mating crimping dies 71, 72, and cut-off dies 73, 74. Shaft 69 further carries cams 75, 76 engaged by suitable cam followers on the arms 77, 78 carried by rock shafts 80, 81, respectively. At a lower level, the respective rock shafts have like arms indicated in dotted lines at 82 in Fig. 1, which carry the respective tucking rolls 83. After each entubed work piece passes between the shafts 69 and 70, the cams 75, 76 permit the oscillation of rock shafts 80, 81 by the respective springs 83 to urge the crimping rolls inwardly, whereby to form a pleat in the sides of the entubing wrapper between the successive work pieces. Immediately the crimping dies 71, 72 flatten and crimp the pleated wrapper as indicated at 84 in Fig. 12 at a point spaced from the entubed work piece, the pleat being visible at 85 between the crimped areas 84 and the entubed work piece. Midway between entubed work pieces, the crimped areas 84 are severed.

Figures 2, 5:
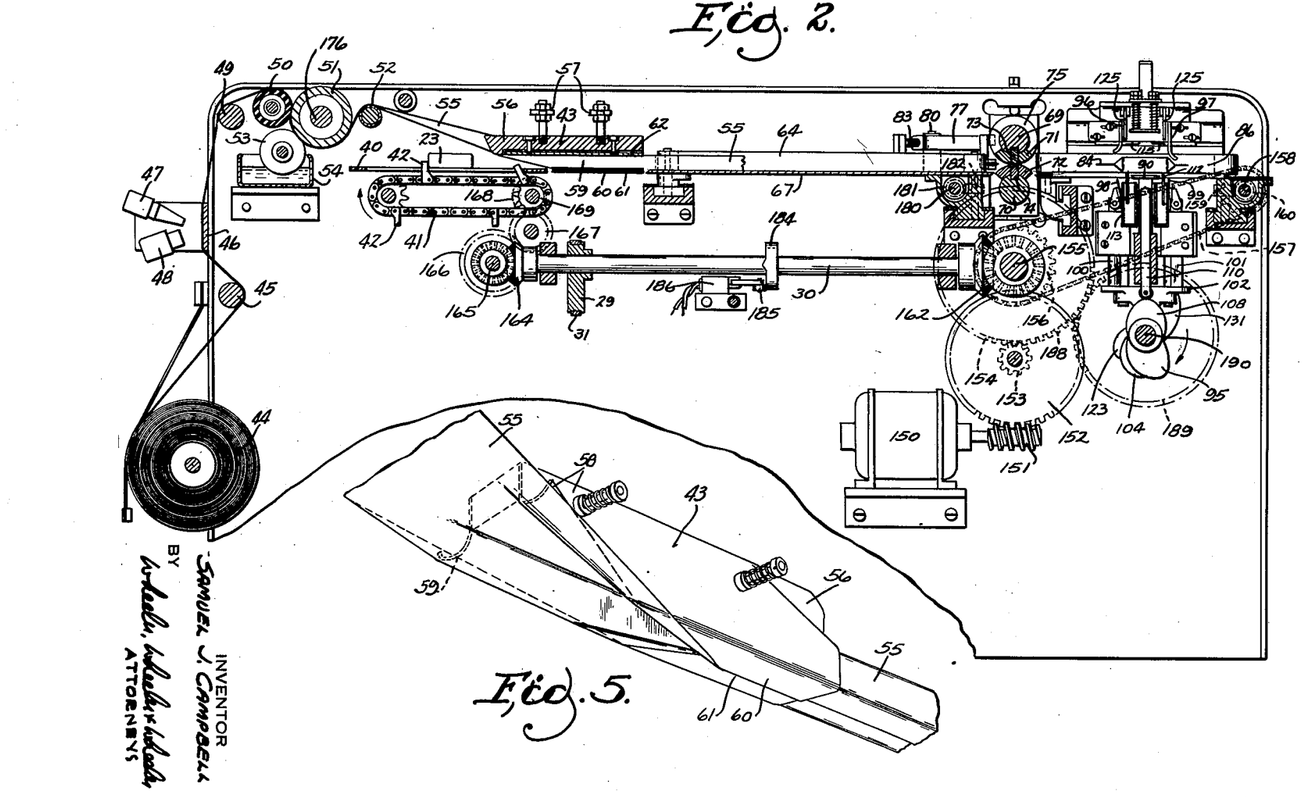
Fig. 2 is a view taken in section on the line 2—2 of Fig. 1.
Fig. 5 is a detail view showing in bottom perspective the folder otherwise best illustrated in Fig. 2 for entubing the web of wrapping material about the article to be wrapped.
Figure 8:
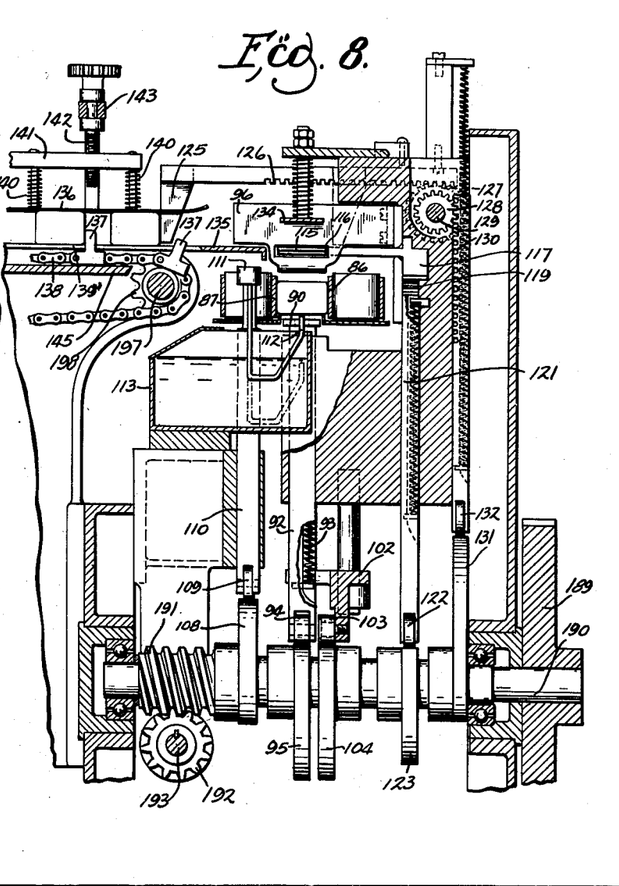
Fig. 8 is a detail view at right angles to the section of Fig. 7 and taken in section substantially on the line 8—8 of Fig. 1.
Figures 9, 10, 11:
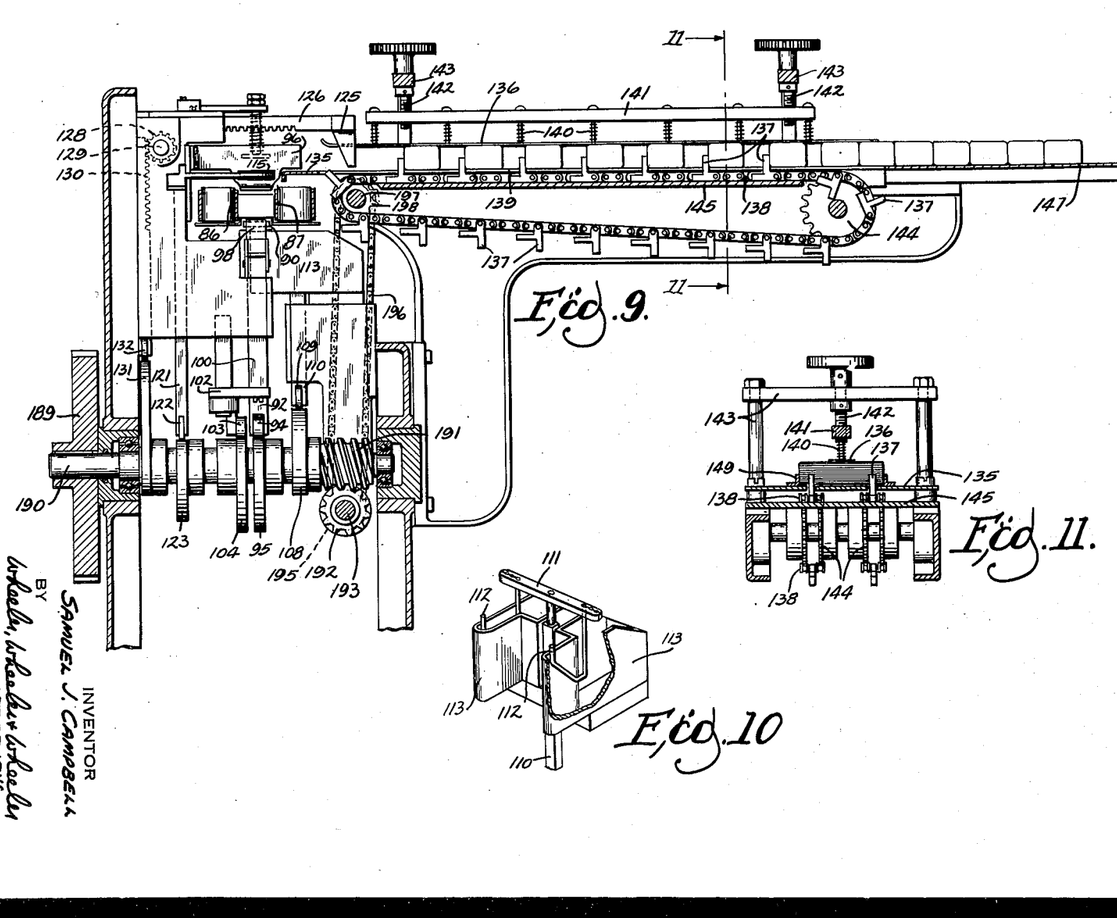
Fig. 9 is a view in side elevation of the discharge end of the machine, portions thereof being broken away to the section indicated at 9—9 in Fig. 1.
Fig. 10 is a view fragmentarily illustrating in perspective the glue pot and gluer employed to effect a seal of the wrapper ends following the end fold.
Fig. 11 is a detail view taken in section on the line 11—11 in Fig. 9.
Figure 12:
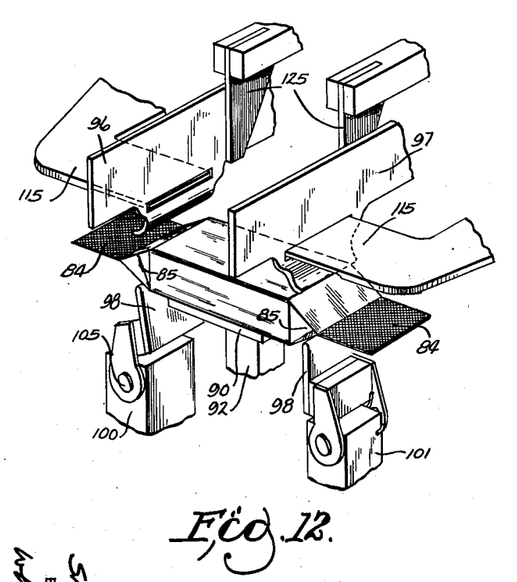
Fig. 12 is an enlarged diagrammatic view in perspective showing the apparatus used to complete the end fold.

As each entubed work piece with the ends of the wrapper crimped at 84, as shown in Fig. 12, leaves the crimping and severing dies, it is advanced at increased speed by lateral conveyors 86, 87 similar to those shown at 64, 65. In the course of its advance, the entubed and separated work piece passes over an elevator 90, as shown in Figs. 1 and 2 and illustrated in more detail in the enlarged views such as Figs. 7, 8 and 12 to 16. The elevator is sufficiently narrow to provide clearance for the gluing fingers hereinafter mentioned. The elevator is carried on a vertically reciprocable plunger 92 urged downwardly by spring 93 whereby the cam follower roller 94 at its lower end is held into contact with cam 95. As the entubed work piece arrives over the elevator, the elevator moves upwardly from the position shown in Fig. 12 toward that shown in Fig. 13, ultimately to force the work between the end folding and clamping plates 96, 97. Meantime, the gluing cam 108 (Fig. 8) is operating follower 109 to raise plunger 110 which has a cross head 111 to which are fastened the gluing fingers 112 for vertical movement upwardly from and return downwardly into the glue trough 113. The fingers 112 are raised from the glue trough sufficiently to pass by the ends of the elevator and to apply spots of glue to the under surface of the wrapper, after which the gluing fingers are lowered back into the trough 113 (Fig. 10).

As the elevator starts upwardly, the vertical tuckers 98, 99, are elevated at an even more rapid rate by their vertically movable slides 100, 101, these slides being cross connected at their lower ends by a yoke 102 carrying a cam follower roller 103 resting on cam 104. At least the vertical tucker blade 98 is preferably pivoted at 105 and provided with a bell crank lever 106 bearing on the cam surface 107 whereby, as the tucker moves upwardly, it will oscillate toward a vertical position from its slightly retrogressive inclination shown in Fig. 7. The purpose of this is to ensure that the tucker blade 98 will follow behind the entubed work piece and push the work piece against tucker blade 99 in the event that the work piece has not fully been delivered at the time the upward movement of the elevator commences.

Figure 13:
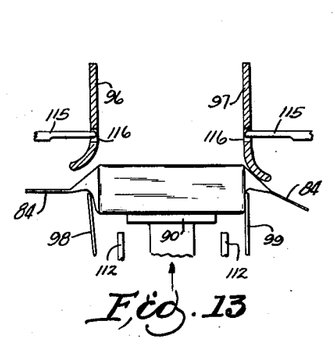
Figs. 13, 14, 15 and 16 are transverse sectional views diagrammatically illustrating successive positions of the parts used in completing the end fold.
Figure 14:
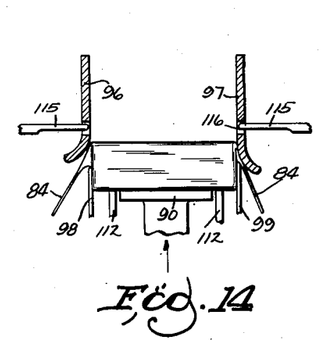

As clearly shown in the successive views, Figs. 12 to 14, the tucking blades 98 and 99 press tightly against the ends of the entubed work piece while the projecting crimped wrapper ends 84 are caught by folding plates 96, 97, and folded downwardly snugly over the end of the work piece and the intervening tucking blades 98, 99.

Figure 15:
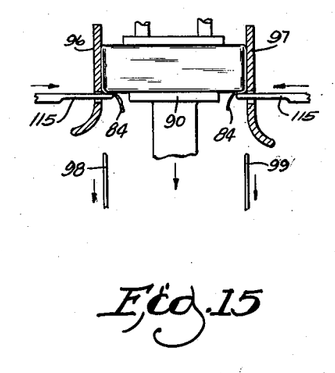

As the work piece continues upwardly between plates 96, 97, the tucking blades 98, 99 are retracted and when the entubed work piece reaches the level shown in Fig. 15, the elevator 90 also moves downwardly.

Figure 7:
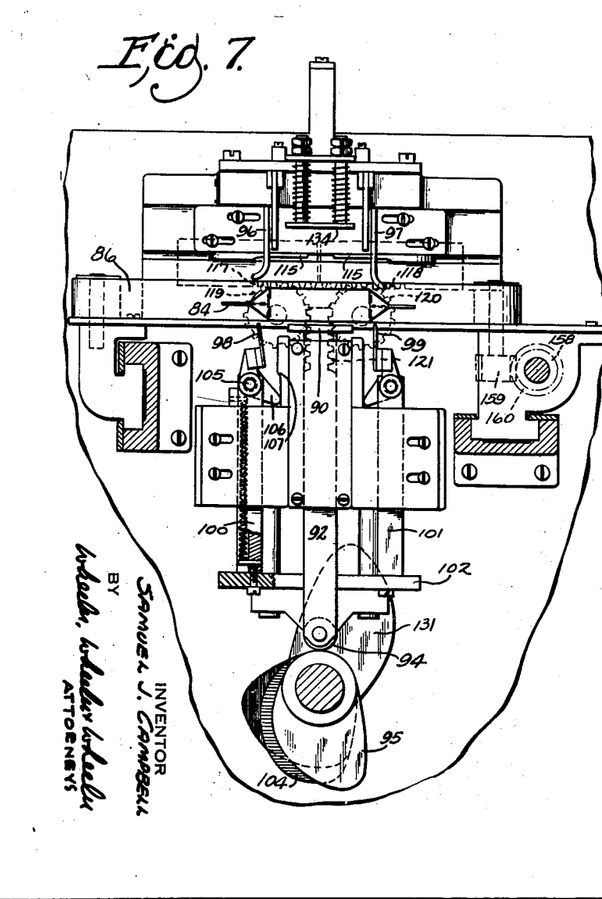
Fig. 7 is an enlarged detail view taken on substantially the same section as Fig. 2.
Figure 16:
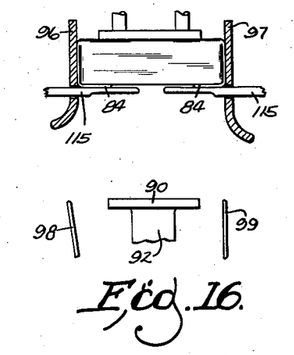

Before the elevator 90 begins to be lowered, the horizontal tucking arms 115 move in laterally through the openings 116 in the respective plates 96, 97. As best shown in Figs. 1 and 12, the horizontal tuckers 115 comprise arms which project forwardly from the respective racks 117, 118 which are illustrated in Figs. 7 and 8. These racks mesh with respective pinions 119, 120, both of which mesh, in turn, with a rack 121 which is vertically reciprocable and carries at its lower end a roller 122 bearing upon cam 123. Thus the raising of roller 122 and rack 121 by cam 123 causes racks 117, 118 to move toward each other whereby the fingers 115 move inwardly from the position shown in Fig. 15 to that shown in Fig. 16, thereby pressing beneath the work piece the crimped ends 84 of the wrapper which, engaging the spots of glue, previously deposited on the under surface of the wrapper, are adherent thereto.

The initial entry of the horizontal tucker blades 115 beneath the work piece supports the work piece while the elevator 90 drops therefrom, the dropping movement having commenced in Fig. 15.

The wrapping is now complete except for the setting of the glue which holds the ends of the wrapper to the face of the wrapped work piece. The wrapped work piece is now ejected by the ejector arms 125, these preferably being in the form of plates disposed vertically just within the clamp plates 96, 97, and carried by racks 126 meshing with pinions 127. These pinions and another pinion 128 are on the same shaft 129, whereby such shaft may be rotated by the vertical reciprocation of rack 130 by the rotation of a cam 131 engaging the cam follower roller 132 on the lower end of rack 130. The upward movement of rack 130 is communicated through pinion 128 and shaft 129 and pinions 127 to effect forward reciprocation of racks 126 and ejector arms 125. This moves the wrapped bar from between the end folding plates 96, 97, which engage its ends, and the horizontal tuckers 115 beneath its bottom, and the pressure plate 134 which engages its top. The wrapped bar is delivered onto the table 135 and beneath a pressure plate 136 which extends longitudinally of such table. Here the wrapped bar is engaged by one of the propelling fingers 137 of conveyor chains 138 which operate beneath the table, the fingers 137 projecting upwardly through slots 139 in the table to engage and propel the work.

The pressure on the longitudinally extending plate or strip 136 is provided by compression springs 140 seated against a carrier 141 which is vertically adjustable by screws 142 whereby not only to accommodate work pieces of varying sizes but readily to permit adjustment of pressure. The screws are threaded into the carrier 141 and supported by brackets 143. The whole arrangement is such as to confine the wrapped bar under just sufficient pressure to hold the inwardly turned ends of the wrapper beneath the wrapped bar until the glue has set. Where the conveyor chain 138 passes about its sprocket 144, the propelling lugs 137, which have theretofore been riding on a track 145, are permitted to pivot from their erected positions to the retracted positions shown in Fig. 9, whereby the lug drops and the bars are pushed by successively arriving bars onto the discharge table 147 from which they are removed by the operator. Each of the propelling lugs 137 is pivoted to the chain on a fulcrum which is forwardly of the point at which the lug projects upwardly into a position for work engagement, the pivot accommodating the dropping of the lug after it clears the track 145. Preferably two conveyors are used as shown in Fig. 11, although one may suffice. Each conveyor comprises a pair of chains between which the lugs are pivoted, the track 145 comprising a plate. Guide rails at 149 confine the ends of the wrapped work during propulsion.

While the driving connections may be varied without affecting the principle of operation, those shown will be briefly described.

The motor 150 represents the source of power which drives through worm 151 and worm gear 152, pinion 153 and gear 154, a shaft 155. The motion transmitted at reduced speeds through the several gears above described to shaft 155 is now divided between the several parts of the machine. The sprocket 156 on such shaft drives chain 157 which communicates motion to a shaft 158 on which the helical gears 159 mesh with gears 160 (Fig. 2) to drive the pulleys over which the belts 86 and 87 operate.

Bevel gearing 162 communicates motion from shaft 155 to a longitudinally extending shaft 30 which, through bevel gears 164, drives cross shaft 165. It is shaft 30 upon which is mounted the eccentric 29 for the intermittent operation of the infeed conveyor 21 as above described.

On the cross shaft 165 is a gear 166 which, through an idler pinion 167 and another gear 168 (Fig. 2 and Fig. 3), drives the forward sprocket 169 over which the conveyor chain 41 is operated to deliver the work into the inverted channel of the wrapping web.

The cross shaft 165 extends at the back of the machine frame to drive one of the gears 166 of a differential gear set having pinions 167 mounted in a casing 168 which is operated by pinion 169 and chain 170 from an auxiliary motor 171. The other gear 172 of the differential gear set is connected to a pinion 173 (Figs. 2 and 3) which, through an idler gear 174, and gear 175, drives shaft 176 upon which feed roll 51 for the wrapping web is mounted. Since the feed of the wrapping web over roll 51 must be synchronized with the rate of advance of the wrapper tube after the articles are entubed therein, power is also taken from shaft 176 through the bevel gear set 177 to drive shaft 178 which, through bevel gear set 179, communicates motion to the cross shaft 180. The spiral gears 181 on shaft 180 drive the complementary gears 182 connected with the pulleys over which belts 64 and 65 operate as best shown in Figs. 1 and 2.

On the main longitudinal drive shaft 30 is a cam 184 which, through cam follower 185, operates a switch 186. The electrical impulses thus generated are synchronized through integrating mechanism not shown, with the impulses generated in the electric eye 47. According to whether these respective impulses from these various sources are in synchronism or out of synchronism, the motor 171 may be operated to correct the rate of wrapper feed in accordance with the rate of article feed on conveyor 41, thus properly registering each label with an article.

If motor 171 is at rest, shaft 165 will rotate gear 166 to transmit motion through the differential pinions 167 to turn gears 172 and 173 in the opposite direction at the same rate at which shaft 165 is rotating. If the electrical impulses received by the electric eye at 47 register with those received through the closing of the switch 186, the motor 171 will operate and, according to its direction of operation, it will either add to or subtract from the rate of rotation of gear 173 by rotating the differential cage and revolving the pinions 167 about the axis of shaft 165. Thus, according to the design of the machine, compensation is effected.

The mechanism for effecting such label registration through the use of integrating electrical mechanism for the operation of the differential above described is known, and, since it forms no part of the present invention, will not be described here in more detail.

Power is also taken from the motion distributing cross shaft 155 through the gear 188 and the meshing gear 189 to drive the cam shaft 190 on which are mounted the gluer cam 108, the elevator cam 95, the vertical tucker cam 104, the horizontal tucker cam 123 and the ejector cam 131, in that order as viewed in Fig. 8.

Shaft 190 also carries a worm at 191 which drives worm gear 192 on shaft 193. Through the sprocket 195 on this shaft, motion is transmitted by a chain 196 to the sprocket shaft 197 on which sprockets 198 operate the conveyors 138 for propelling the wrapped articles to the discharge point.

Motion from the same power dividing shaft 155 is transmitted to shaft 69 for the operation of the crimping and cut-off dies and the tucking rolls through a specially designed pair of eccentric gears 199, 200, separately illustrated in Fig. 6. Shafts 69 and 70 are geared together at 201 to partake of the irregular rotating movement which results from the intermeshing of the eccentric gears 199, 200. The eccentricity of the gears 199, 200 causes a relatively accelerated motion of the crimping and cutting dies whereby the peripheral speed of the dies corresponds to the lineal speed of the wrapper at the moment these dies are interengaged through the wrapping web. The relatively faster motion on this portion in the cycle is compensated by a relatively slower motion through the rest of the cycle when the dies are inoperative. The dies used are preferably small, as large dies would require a greater length of web to intervene between the wrapped articles in order that the dies might mate without damaging the articles. Since the dies are small, their peripheral travel is less than the length of the article and in order that the dies may register with the web intervening between successive articles, it is necessary to retard their rotation during the passage of the articles and then to accelerate them during the crimping and cutting movement.

As above indicated, one of the advantages of the mechanism herein disclosed lies in the fact that longitudinal lap of the wrappers is effected beneath the work piece and the end fold is effected on the same lower face of the work piece on which the longitudinal lap of the wrapper is found, thus leaving the top of the work piece fully available for advertising, the work piece being maintained right side up at all times throughout its progress through the apparatus.

Another advantage of the device as disclosed lies in the relative simplicity with which it may be adapted to handle work pieces and wrappers of differing sizes. The wrapper web feed rolls 49, 50, 51, etc., are amply wide to receive a web of greatly increased width. The feed conveyors 64, 65 and their supporting plates 67 and associated driving gears are adapted to be unitarily adjusted to and from each other transversely of this portion of the machine and the same is true of conveyors 86, 87 and their associated driving gears. Since the crimping and cut-off dies are wide enough to handle a greatly increased wrapper width, a change of the web channelling former and simple adjustments in the spacing of the lateral feed conveyors are all that is required to handle articles of differing width and corresponding variations in wrapper width. Changes to compensate for variations in length of the article are almost as simple.

The eccentric gears 199 and 200 must be changed for another set and the clamping plates 96, 97 must be varied in spacing by adjusting them through the screw and slot mountings shown in Fig. 7. Similarly the tucking blades 98, 99 must be varied in spacing, this being done by similar mounting adjustments using the screw and slot means shown in Fig. 7. The adjustment in spacing between the guide rails 149 on the outfeed conveyor table is the only other change required. Adjustments in height of the wrapped article are accommodated by adjusting the various top pressure bars through means previously disclosed.

The entire machine is exceptionally compact, occupying but little floor space and minimizing any requirements for operator attention.

It is considered to be a substantial advantage to have the article fed into the machine laterally, moved longitudinally during wrapping, moved vertically during the end folding operation, and then moved out of the machine laterally, and preferably in the opposite direction to that at which it entered.

I claim:

1. In combination, a feed table having a conveyor belt upon which elongated work pieces may be assembled transversely of the belt, guide means to which the ends of such work pieces may be aligned on such belt, means for the intermittent actuation of the belt, positively operable conveyor means extending transversely of the delivery end of the belt for the endwise propulsion of work pieces and adapted to receive laterally a work piece from the belt at each intermittent operation of the belt, means for guiding a wrapper web over said conveyor means and convergently theretoward, said web guiding means including an entubing former having a web channeling device opening downwardly to receive into the channelled web successive work pieces propelled by said conveyor means, together with folding wings lapping beneath the path of work piece movement and adapted to fold margins of the web into lapping relation beneath the work pieces to complete the entubing thereof.

2. The combination set forth in claim 1 in further combination with laterally-spaced conveyor means positioned to engage the sides of tubed wrapper and entubed work pieces for the propulsion thereof from said entubing device.

3. The combination set forth in claim 1 in further combination with laterally-spaced conveyor means positioned to engage the sides of tubed wrapper and entubed work pieces for the propulsion thereof from said entubing device, and means in path of movement of said wrapper and entubed work pieces beyond said conveyors for pleating, transversely pressure sealing and severing portions of said wrapper between entubed work pieces.

4. In a wrapping machine, the combination with means for entubing successive work pieces in a wrapper web and including means for longitudinally propelling elongated work pieces into said web for entubing therein, of means for delivering elongated work pieces laterally to said propelling means, means for severing the entubing web intermediate work pieces entubed therein, means for folding into face contact with an entubed work piece the severed end of the entubing web, means for discharging the wrapped work pieces laterally, spaced guides engaged by the ends of the laterally discharged work pieces for setting such ends as folded, the entubing means comprising means for forming said web in the course of its continuous advance into a downwardly opening channel into which successive work pieces are longitudinally delivered, and means for folding the margins of the moving web into lapping relation beneath the work piece.

5. The combination set forth in claim 4 in which the end folding means comprises means for folding such ends beneath the entubed work piece and upon that face thereof on which the margins of the web are lapped.

6. In a wrapping machine, web entubing means comprising a former having a downwardly opening channel at its web-receiving end and flanges at the lower margins at the sides of such channel extending inwardly from said sides into lapping relation, in combination with a work propelling conveyor substantially parallel with the channel and at substantially the level of the uppermost of said flanges and extending beneath the web-receiving end of said channel for delivering work pieces substantially rectilinearly into the inverted channel to be enveloped by margins of said web folded therebeneath by said flanges, downwardly inclined web guiding extensions of said flanges at the receiving end of the channel and means for delivering the web thereto from above the conveyor and at an angle to the channel.

7. In a wrapping machine, the combination with a first conveyor means for feeding work pieces entubed in a wrapper, of second conveyor means for acceleratedly propelling entubed work pieces, and means between said conveyor means for flattening and severing the wrapper between entubed work pieces.

8. The combination set forth in claim 7 in combination with means for pleating the wrapper, the means for pleating, flattening and severing the wrapper being provided with driving connections for varying the rate of operation thereof in relation to the rate of wrapper and work piece movement.

9. The combination set forth in claim 7 in combination with means for pleating the wrapper, the means for pleating, flattening and severing the wrapper comprising a pair of shafts, crimping and severing dies carried thereby and having limited arcuate extent, and mechanism for operating one of said shafts comprising a pair of eccentric gears for varying the relative rate of shaft rotation.

10. In a device for feeding and entubing a wrapper and spaced work pieces entubed therein, and having means for acting on the wrapper between entubed work pieces, the improvement in said means which comprises rotary die members having discontinuous arcuate die surfaces interacting between said entubed work pieces and means for the non-uniform rotation thereof including means effecting rotation thereof at a peripheral rate approximating the rate of wrapper advance at the moment when said die members interact respecting said wrapper and at a lower peripheral rate when said members are free of the wrapper.

11. The combination set forth in claim 10 in which the means for non-uniform rotation of said die members comprises a set of eccentric gears.

12. A wrapping machine for applying to successive work pieces wrappers marginally lapping beneath the work pieces and having projecting end portions also folded therebeneath without inverting the work pieces, which machine comprises means for feeding work pieces right side up, means for feeding a wrapper web, an entubing device comprising means for downwardly channeling the wrapper and lapping its margins beneath successive work pieces in the course of wrapper advance while such work pieces remain right side up, means for severing the wrapper between successive work pieces leaving projecting end portions, and means for folding such end portions across the ends of successive work pieces and toward the lower faces thereof on which side marginal portions of the respective wrappers are lapped, while maintaining the work pieces right side up, and means for discharging wrapped work pieces.

13. The combination set forth in claim 12 in which the means for folding projecting wrapper ends comprises means for elevating each successive work piece while obstructing the elevation of its ends, vertical tucker blades about which the obstructed end portions of the wrapper are folded downwardly in the course of work piece elevation, actuating connections for said elevating means and vertical tucker blades comprising means for withdrawing the tucker blades and elevating means, said end obstructing means comprising plates adapted to engage the ends of partially wrapped work pieces, and horizontal tucker blades having means for moving them endwise beneath the supported work piece in engagement with the downwardly projecting wrapper ends whereby to fold such ends beneath the work piece, said last means being timed to support the work piece just as said elevating means is withdrawn.

14. In a device of the character described, the combination with an elevator, of a pair of spaced clamp plates thereabove, means for delivering work pieces with projecting wrapper ends onto the elevator, means for actuating the elevator to raise said work pieces between said plates, whereby said plates fold the projecting wrapper ends downwardly respecting the work pieces, longitudinal tuckers operable beneath the elevated work pieces in engagement with the downwardly projecting ends for folding such ends beneath the work pieces, and means for ejecting the wrapped work pieces from between said plates with the wrapper ends folded therebeneath.

15. The combination set forth in claim 14 in further combination with means for operating the elevator, the tucking blades and the ejector, said means comprising a set of cams, a shaft on which said cams are supported, means for rotating said shaft, and cam follower means engaged by the respective cams and operatively connected respectively with the elevator, the tucking means and the ejector for the actuation thereof.

16. In a device for folding the projecting ends of a wrapper in which a work piece is entubed, the combination with an elevator, of a pair of spaced fold plates thereabove, a pair of vertical tucking blades between the ends of the elevator and the respective plates, a pair of horizontal tucking blades, said plates having openings for the movement of the last mentioned tucking blades therethrough, means for lifting said elevator to position a work piece between said plates and to fold such wrapper ends downwardly, means for simultaneously lifting said vertical tucking blades toward the center of the work piece whereby to rectify the folding of wrapper ends projecting from said work piece and acted upon by said plates, and means for retracting the elevator and vertical tucking blades while actuating the horizontal tucker blades to fold such wrapper ends beneath the work piece and support the work piece.

17. The combination set forth in claim 16 in which one of said vertical tucking blades is pivoted for movement to and from the other and is provided with means for erecting it toward the other in the course of its upward movement.

18. The combination with an elevator and means for delivering thereto a work piece entubed in a wrapper having projecting ends, of a first tucking blade positioned beyond the elevator in the path of work piece advance, a second tucking blade positioned before the elevator and over which the work piece is delivered to the elevator, said second tucking blade being provided with a mounting upon which it is relatively movable from a normally retracted position to a position closer to the elevator, and means for simultaneously raising the elevator and said blades, said means being adapted to raise said blades faster than the elevator whereby to position the work piece on the elevator and including mechanism for moving said second tucking blade from its retracted position from the elevator in the course of the upward movement thereof whereby to push into contact with the first tucking blade a work piece which may not fully have advanced thereto over the elevator.

19. A machine for compactly receiving articles right side up and for entubing them in a wrapper lapped beneath the respective articles and subsequently folding the ends of the wrapper downwardly toward the lower side of the article on which the wrapper is lapped, said machine comprising wrapper web feeding means, wrapper tubing means comprising a downwardly opening channel, folding flanges extending beneath the path of the article for lapping the wrapper margins therebeneath, an article conveyor arranged to deliver articles longitudinally into said channel to be entubed in the wrapper, means for severing the tubed wrapper between successive articles entubed therein, leaving wrapper ends projecting beyond the ends of the article, an end folding apparatus including means for elevating each entubed article and restraining upward movement of the wrapper ends whereby such ends are folded downwardly toward the lower face of the article on which the wrapper is lapped.

20. The combination set forth in claim 19 in which the severing means includes means for flattening the tubing wrapper adjacent the points of severance and securing in face contact the flattened upper and lower portions of the wrapper.

21. The combination set forth in claim 19 in further combination with an infeed conveyor for delivering successive articles onto the conveyor which delivers them longitudinally to the wrapper, and an outfeed conveyor substantially parallel to the infeed conveyor and at right angles to the direction of wrapper movements, and ejector means for delivering to the outfeed conveyor wrapped articles having the wrapper ends folded.

22. A wrapping machine comprising the combination with a first conveyor and a second and infeed conveyor arranged to deliver successive work pieces from its end onto the first conveyor and means for intermittently advancing and partially retracting the infeed conveyor whereby to remove successive work pieces from contact with the work pieces delivered, said means comprising a slip clutch having a driven part, means for driving said driven part in one direction and means for restraining drive of the driven part in a reverse direction, said restraining means having lost motion, of means for guiding a wrapper web over said first conveyor means, said web guiding means including an entubing former having a downwardly opening channel to receive successive work pieces propelled by said first conveyor means, said former having folded wings lapping beneath the path of work piece movement and adapted to fold margins of the web into lapping relation beneath the work pieces, third conveyor means positioned to engage the tubed wrapper and entubed work pieces for propulsion thereof from said entubing former, a fourth conveyor means for accelerating propelling entubed work pieces received from said third conveyor and means between said third and fourth conveyor comprising die members having discontinuous die parts including severing dies which interact between the entubed work pieces, and means for the non-uniform rotation of said die members, an elevator to which said fourth conveyor delivers the severed wrapped work pieces and means for folding the severed wrapper ends beneath the work pieces and over the lapped margins of the web, said folding means comprising vertical tucker plates positioned to downwardly fold said ends in the course of work piece elevation and horizontal tucker blades having means for moving them endwise beneath the work pieces into engagement with the downwardly folded wrapper ends, and a fifth and discharge conveyor and ejecting means for delivering wrapped work pieces from between said vertical tucker blade to said fifth conveyor, said fifth conveyor having means for pressing said work pieces against said conveyor to maintain said wrapper ends folded beneath the work piece during the course of movement of the work pieces along the fifth conveyor.

SAMUEL J. CAMPBELL.

REFERENCES CITED

The following references are of record in the file of this patent:

UNITED STATES PATENTS

| Number | Name | Date |
|---|---|---|
| 755,953 | Smith | Mar. 29, 1904 |
| 883,803 | Herz | Apr. 7, 1908 |
| 1,117,260 | Sevigne | Nov. 17, 1914 |
| 1,341,408 | Armstrong | May 25, 1920 |
| 1,626,412 | James | Apr. 26, 1927 |
| 1,654,871 | Gage et al. | Jan. 3, 1928 |
| 1,729,237 | Albertoli | Sept. 24, 1929 |
| 1,965,897 | Jurgens et al. | July 10, 1934 |
| 1,980,641 | Stone | Nov. 13, 1934 |
| 1,991,003 | Stevens | Feb. 12, 1935 |
| 2,054,406 | Betts | Sept. 15, 1936 |
| 2,145,636 | Scharf | Jan. 31, 1939 |
| 2,212,993 | Taylor | Aug. 27, 1940 |
| 2,214,430 | Molins | Sept. 10, 1940 |
| 2,260,332 | Petskeyes | Oct. 28, 1941 |
| 2,301,543 | Hlavaty | Nov. 10, 1942 |
| 2,332,096 | McGinley | Oct. 19, 1943 |
| 2,462,254 | Campbell | Feb. 22, 1949 |
| 2,467,879 | Billeb | Apr. 19, 1949 |